United States Patent
Ripert et al.

(10) Patent No.: US 9,256,821 B2
(45) Date of Patent: Feb. 9, 2016

(54) METHOD FOR MANUFACTURING INSERTS FOR ELECTRONIC PASSPORTS

(75) Inventors: Anne Ripert, Marseilles (FR); Pierre Volpe, Auriol (FR); Yves-Pierre Cuenot, La Ciotat (FR); Guillaume Henaut, Gardanne (FR)

(73) Assignee: SMART PACKAGING SOLUTIONS (SPS), Zi de Rousset (FR)

( * ) Notice: Subject to any disclaimer, the term of this patent is extended or adjusted under 35 U.S.C. 154(b) by 290 days.

(21) Appl. No.: 14/009,930

(22) PCT Filed: Apr. 4, 2012

(86) PCT No.: PCT/FR2012/000127
§ 371 (c)(1),
(2), (4) Date: Dec. 16, 2013

(87) PCT Pub. No.: WO2012/136905
PCT Pub. Date: Oct. 11, 2012

(65) Prior Publication Data
US 2014/0103118 A1    Apr. 17, 2014

(30) Foreign Application Priority Data
Apr. 5, 2011 (FR) ..................... 11 01018

(51) Int. Cl.
*G06K 19/06*    (2006.01)
*G06K 19/077*    (2006.01)
*G06K 19/02*    (2006.01)

(52) U.S. Cl.
CPC ........ *G06K 19/07749* (2013.01); *G06K 19/025* (2013.01); *Y10T 29/49018* (2015.01)

(58) Field of Classification Search
USPC ......................................... 235/492
See application file for complete search history.

(56) References Cited

U.S. PATENT DOCUMENTS

2003/0178495 A1    9/2003    Jones et al.

FOREIGN PATENT DOCUMENTS

WO    WO 01/03188 A1    1/2001

OTHER PUBLICATIONS

International Search Report (PCT/ISA/210) mailed on Jul. 18, 2012, by the French Patent Office as the International Searching Authority for International Application No. PCT/FR2012/000127.

*Primary Examiner* — Rafferty Kelly
(74) *Attorney, Agent, or Firm* — Buchanan Ingersoll & Rooney PC

(57) ABSTRACT

A method for manufacturing inserts provided with an electronic module supporting a chip and an antenna includes supplying top and bottom substrate sheets for a plurality of inserts, said substrates being provided with cavities for subsequently inserting an electronic module in each cavity; providing an antenna for each insert; providing at least one layer of adhesive; providing stacking and assembling by lamination a bottom substrate sheet, a first layer of adhesive, a plurality of antennas, a second layer of adhesive and a top substrate sheet; cutting the laminated assembly to obtain inserts each provided with an antenna; inserting electronic modules in the cavities after the step of laminating the substrate sheets, antennas and layers of adhesive. The method also includes printing the inner surface of at least one of the substrate sheets with a thickness-compensation layer, outside the substrate area intended for receiving the antenna.

6 Claims, 4 Drawing Sheets

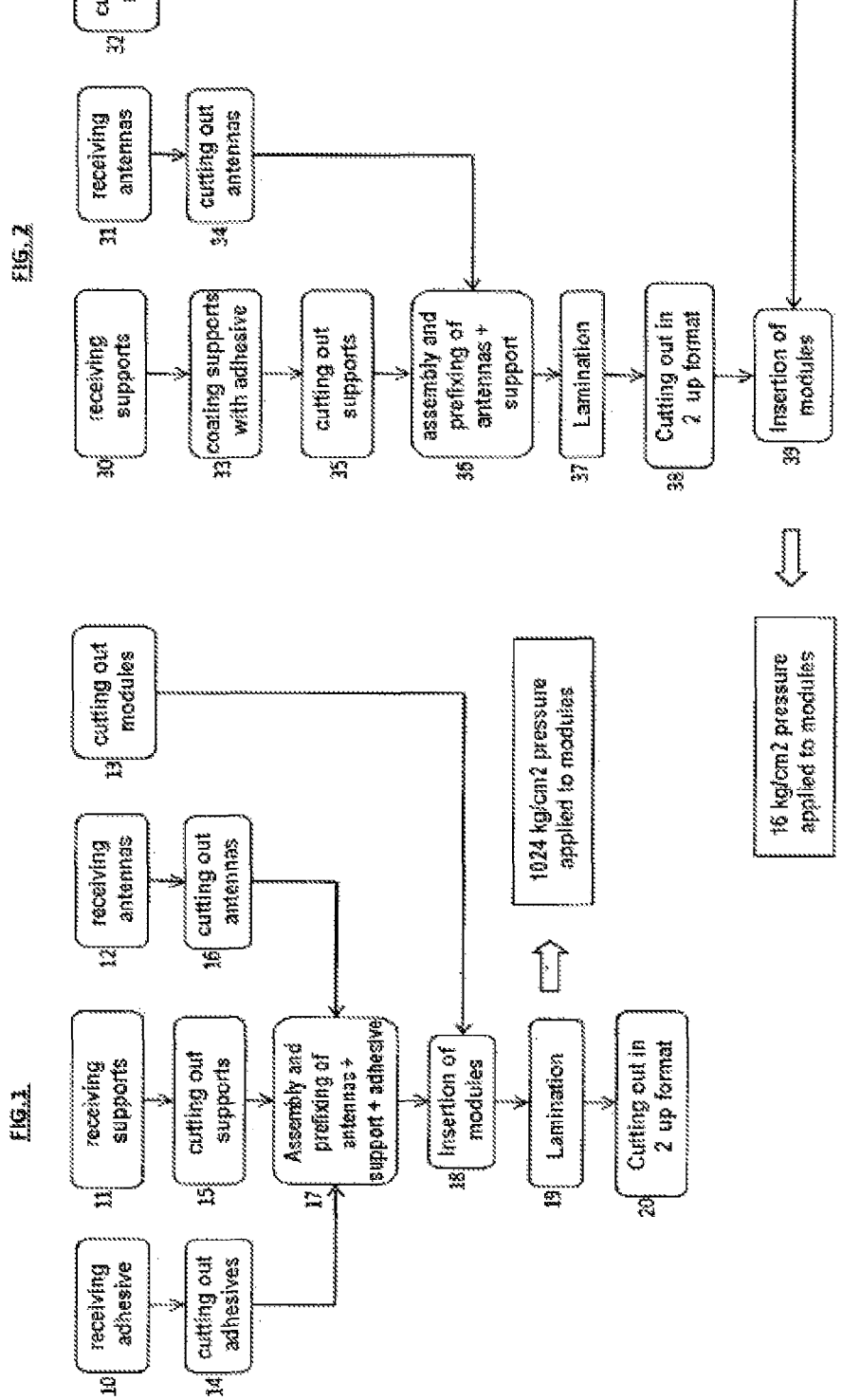

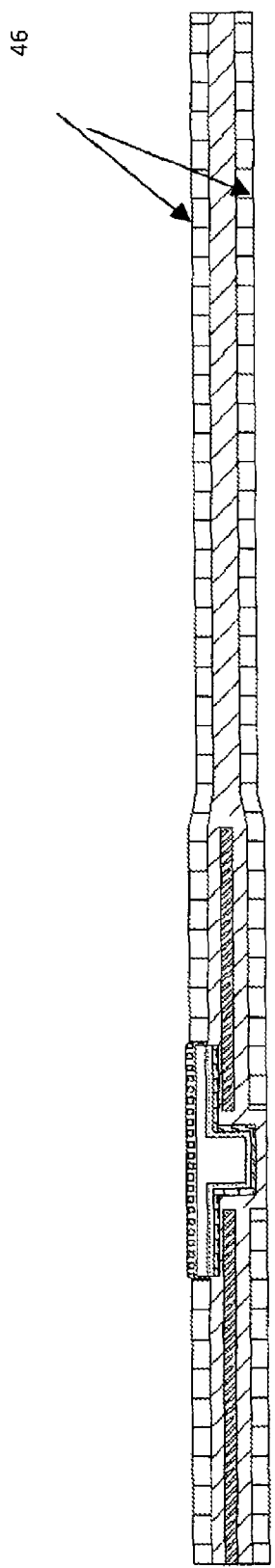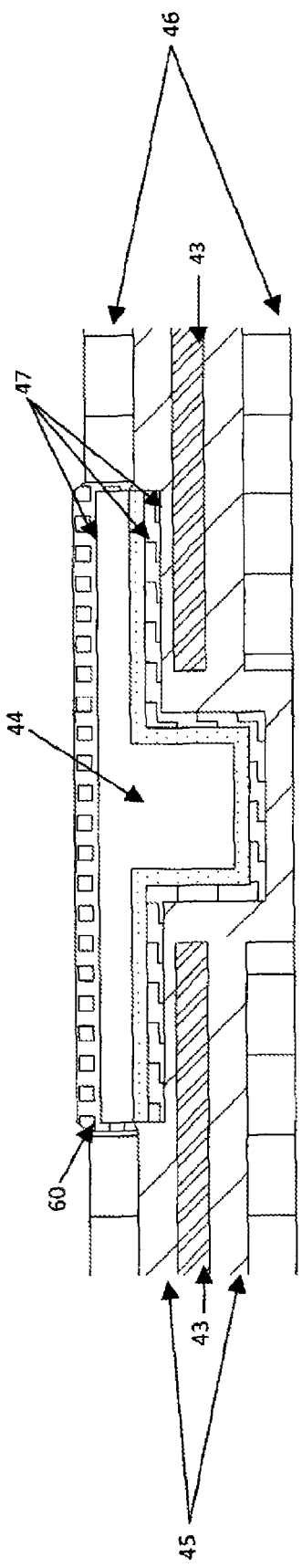
FIG. 4A
FIG. 4B

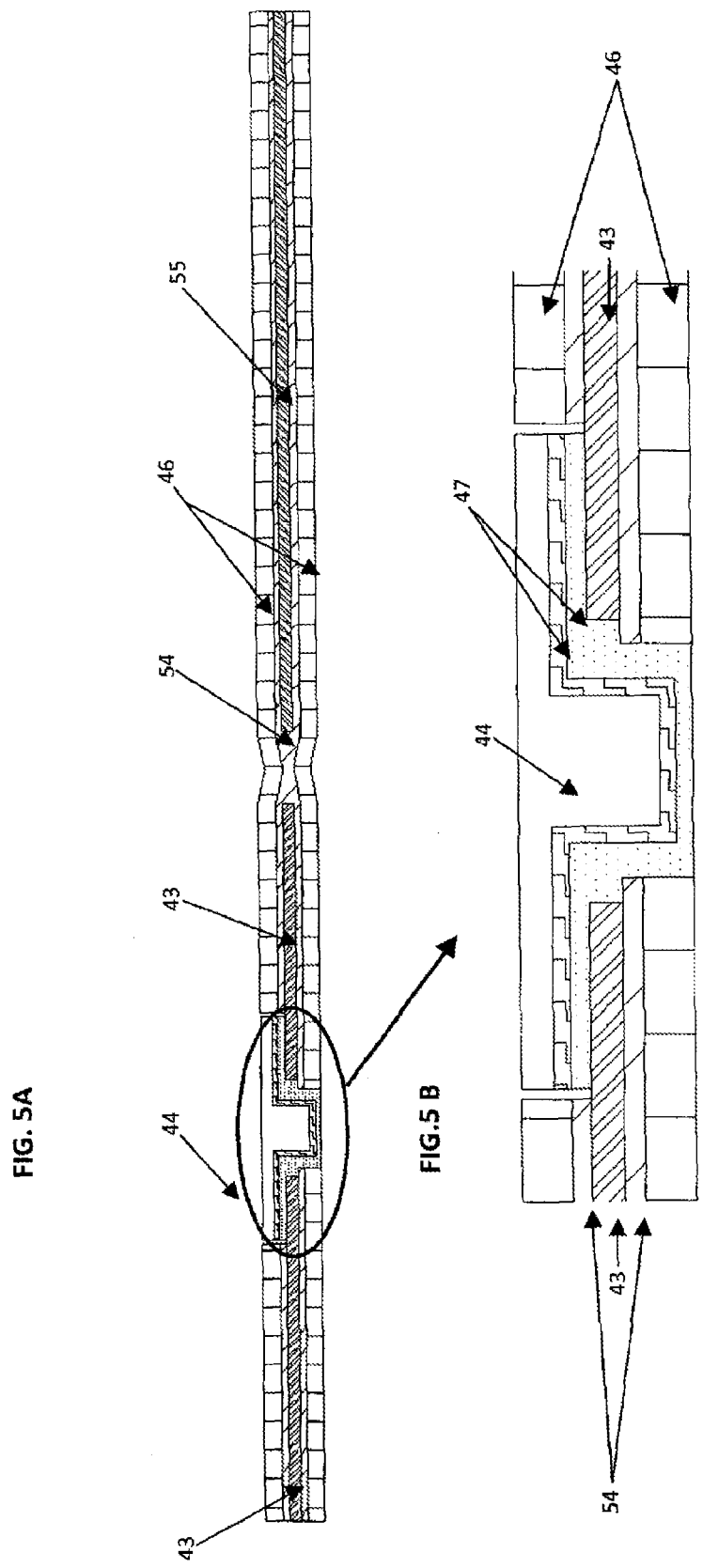

METHOD FOR MANUFACTURING INSERTS FOR ELECTRONIC PASSPORTS

The invention relates to a new method for manufacturing electronic inserts for identification documents, notably for electronic passports, as well as to the structure of the insert obtained by the implementation of the method.

THE PRIOR ART

Methods are already known for the manufacture of electronic passports comprising on the one hand a booklet composed of superimposed sheets of paper and bound by a central binding, in which at least one of the sheets of the booklet comprises several layers of plastic and/or paper as well as a flexible insert provided with an electronic module and an antenna, said insert being included between two adjacent layers of the sheet provided with the insert.

DISADVANTAGES OF THE PRIOR ART

The manufacture of inserts currently used for documents such as electronic passports raises several problems.

A first problem arises from the succession of manufacturing steps of the insert itself. In fact, according to the known manufacturing method, there is deposited on a paper or plastic support sheet an adhesive film upon which a metal antenna is placed as well as an electronic module that is generally electrically connected to the antenna. The assembly is then coated with another layer of adhesive film and, finally, a second support sheet is superimposed. When the stack is complete, the assembly is laminated in a laminating press, which has the effect of uniting the different layers with each other because of the presence of the adhesive layers.

In the known method, the laminating pressure is intended to be applied over the whole area of the insert, but in the case where the electronic module has excess thickness, even slight, the pressure applied locally on the module, which has an area very much smaller than that of the insert, can be of the order of 200 times the nominal pressure. This excessive pressure applied on the module can sometimes break it, or break the possible connections between the contact pads of the antenna and those of the electronic module.

This is very inconvenient because the manufacturing yields are negatively affected by it. This is even more harmful, from the economic point of view, because the electronic module, which includes an electronic chip, is the most expensive component of the insert.

Another problem of the method of manufacturing inserts according to the prior art relates to the fact that the adhesive used is a rolled adhesive, provided with a protection or an adhesive support, referred to as a "liner". The use of such an adhesive provided with a "liner" is both costly and likely to have defects affecting the overall manufacturing yield.

A third problem relating to the method of manufacturing inserts according to the prior art arises from the fact that the antenna, because of its relatively high cost, is not generally deposited over the whole of the area of the support. The antenna of such an insert has a thickness of the order of 80 micrometers, whereas the insert itself has a total thickness of the order of 400 micrometers. It can therefore be seen that the absence of the antenna over a large part of the area of the insert naturally produces a "step" effect, an irregularity in the thickness of the insert, whereas the specifications of electronic passports impose increasingly draconian standards of flatness of the pages of passports. It is known per se to compensate for the excess thickness due to the antenna by the interposition of a thickness-compensating sheet, but it is difficult to implement and incurs additional cost and a risk of an additional drop in the manufacturing yield.

OBJECTIVES OF THE INVENTION

A general objective of the invention is consequently to propose a new method for manufacturing electronic inserts intended for inclusion in security documents such as electronic passports, this method being capable of solving the technical problems mentioned above.

A more specific objective of the invention is to propose an improved manufacturing method which makes it possible to produce inserts for electronic passports, without the electronic module of the insert being subjected to the laminating pressure applied to the rest of the insert.

Another objective of the invention is to propose a method for manufacturing inserts which is capable of producing inserts having fewer flatness defects, which will allow their integration in security documents such as electronic passports in a more unobtrusive manner.

Another objective of the invention is to propose a method for manufacturing inserts having a lower unit cost, a higher manufacturing yield and higher production rates.

BRIEF DESCRIPTION OF THE INVENTION

These objectives are achieved by the manufacturing method according to the invention and by the proposed new insert structure.

For this purpose, the invention relates to a method for manufacturing electronic inserts, and electronic inserts, such as defined in the claims.

According to the principle of the invention, the electronic module is no longer integrated in the insert before the lamination of the latter, but the support, antenna and adhesive layers are laminated together firstly and the electronic module is only added after the lamination, in a cavity provided for this purpose. This makes it possible to prevent the electronic module from being damaged by the application of excessive pressure.

Moreover, in order to optimize the lamination of the layers of the insert before integration of the module, it is useful to modify and facilitate the use of adhesives providing the cohesion for the insert. The method according to the invention provides for the use of adhesives printed directly on the support layers of the inserts, instead and in place of the adhesives in rolls or sheets used prior to the invention.

The method according to the invention also provides for the use, in order to compensate for the thickness of the antenna, of a compensation layer directly printed in the area that has no antenna, instead and in place of the thickness compensation sheets used prior to the invention. This makes it possible to avoid the handling of sheets of adhesive.

More precisely, the invention therefore relates to a method for manufacturing inserts provided with an electronic module bearing a chip and an antenna, comprising the steps consisting in:
  providing lower and upper support sheets for several inserts, said supports being provided with cavities for the subsequent insertion of an electronic module in each cavity;
  providing an antenna for each insert;
  providing at least one layer of adhesive;
  providing an electronic module for each insert;

superimposing and assembling by lamination a lower support sheet, a first layer of adhesive, a plurality of antennas, a second layer of adhesive and an upper support sheet;

cutting out the laminated assembly in such a way as to obtain inserts each provided with an antenna, this method being characterized in that the electronic modules are inserted into the cavities of the inserts only after the step of assembly by lamination of the support sheets, the antennas and the layers of adhesive.

In this way, a previously tested electronic module of good quality is inserted in each insert cavity only after the step of laminating the layers of the latter, which prevents the electronic module from being subjected to the laminating pressure.

Advantageously, the manufacturing method according to the invention provides for each electronic module being inserted into a cavity corresponding to the insert using light pressure, less by substantially two orders of magnitude with respect to the laminating pressure of the support.

Thus, the pressure for fixing the electronic module during the so-called insertion step is for example of the order of 10 to 20 kgf/cm2.

Preferably, the adhesive deposited between the support sheets and the antennas, is an adhesive printed on the support.

Advantageously, the method furthermore comprises a step consisting in printing, on the inside face of at least one of the support sheets, a thickness-compensation strip, outside of the area of the support intended for receiving the antenna.

The invention also relates to an insert for the manufacture of an electronic passport, characterized in that it is produced according to the manufacturing method described above.

The invention furthermore relates to a booklet for a passport, characterized in that it integrates an insert of the above type between at least two of its pages.

Other features and advantages of the invention will become apparent on reading the detailed description and the appended drawings, in which:

FIG. 1 shows a flowchart of the method for manufacturing inserts for electronic passports, according to the prior art;

FIG. 2 shows the flowchart of the method for manufacturing inserts according to the present invention;

FIGS. 4A and 4B show the insert of FIG. 3, according to the prior art, in a cross-sectional view through A-A in FIG. 3;

FIGS. 5A and 5B show the insert of FIG. 3, in a cross-sectional view through A-A of FIG. 3, but including the structural modifications resulting from the manufacturing method modified according to the invention.

Figure 3:
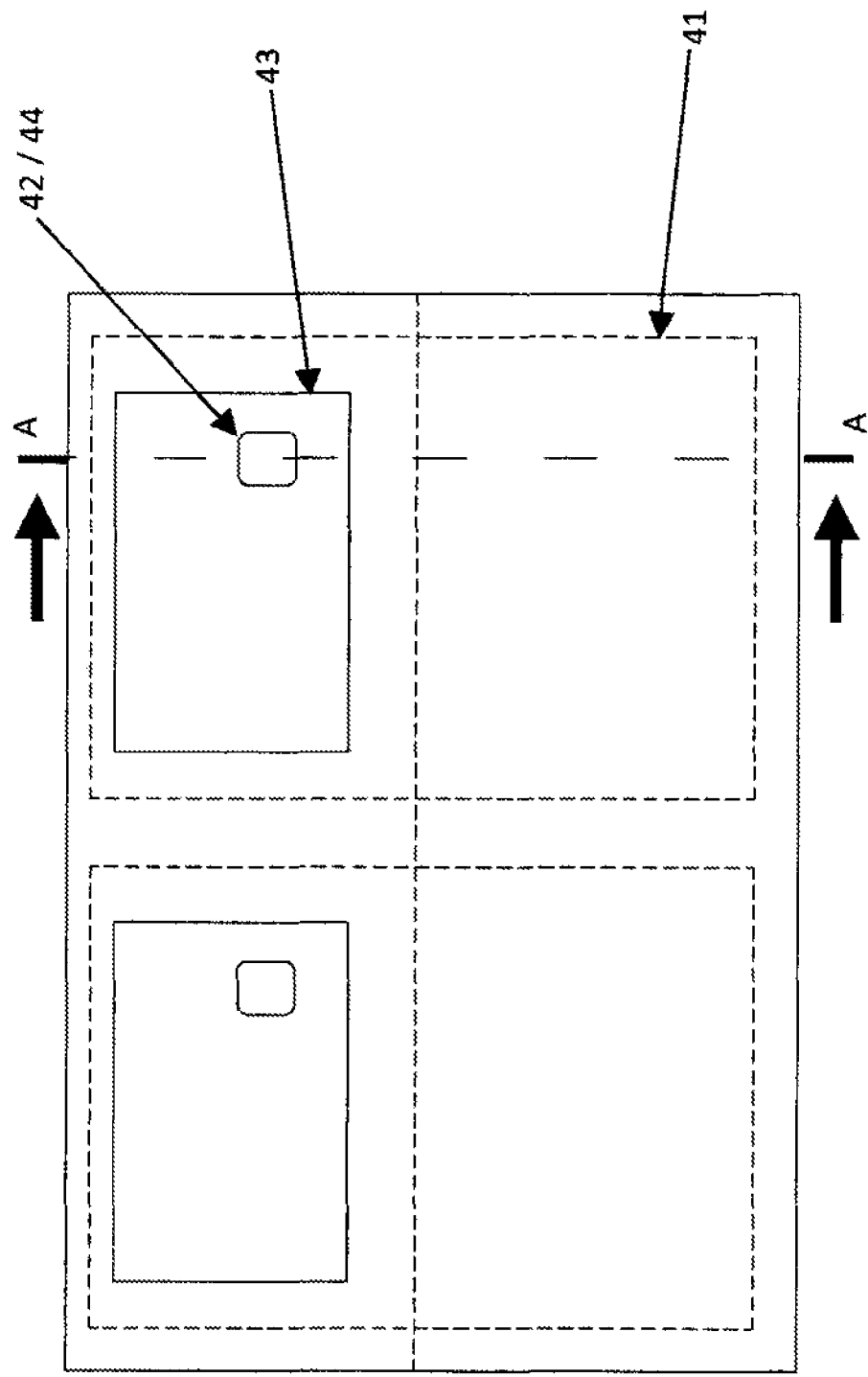
FIG. 3 shows a plan view of an assembly of two inserts, before individualizing by cutting out.

Reference is made to FIG. 1. In this figure there has been shown a flowchart of a method for manufacturing electronic inserts for security documents. The first steps 10, 11, 12 in parallel consist in providing the components to be assembled, namely sheets or rolls of adhesive (step 10), substrate sheets made of paper or plastic (step 11), antennas (step 12) which are generally in the form of very thin sheets coated with a silk-screen printed, etched, printed, or even sewn, metal antenna, and electronic modules (supplied in step 13) which essentially comprise an encapsulated electronic chip and contact areas intended to be put into contact with corresponding contact areas of the antenna.

After the phase of provision (10, 11, 12, 13) of components, some of which have a format corresponding to a plurality of inserts (this is notably the case of supports in form of large-dimension sheets), a cutting out of the components is carried out (steps 14, 15, 16) in order to facilitate the assembly of individual inserts.

The supports or substrates are supplied as sheets, and it is necessary (step 15) to cut out cavities in them in order to receive the modules, and to cut between them in order to adapt the number of positions (for example 2, 3 or 4 positions) to the number of inserts that the machines can laminate in parallel.

It is possible, notably for silk-screen printed antennas, for them also to be provided as sheets each bearing several antennas, so that it is also necessary to cut them out (step 16) so that their number corresponds to that of the number of inserts manufactured in parallel.

Then, instead of proceeding with the simultaneous assembly of a large number of inserts, which would be too complex to implement, one, two or three inserts are then assembled simultaneously.

In order to assemble an insert (step 17), an adhesive sheet, then the antennas and then another adhesive sheet and possibly a thickness-compensating sheet for the area not covered by the antenna are added onto a lower support. The adhesive sheet is typically clad with a protective support or "liner", which must be removed from the two adhesive sheets mentioned above. Then an upper support sheet is added and then the modules are deposited, which corresponds to the adding of an electronic module (step 18) with suitable relative positioning on the support, and the assembly is laminated (step 19) in a laminating press, before proceeding with the final cutting out (step 20), the effect of which is to cut out a panel of two or more inserts, which will later be cut into individualized inserts by the manufacturer of the electronic passport.

The result of this known method is that the electronic module, which is the most expensive component of the insert and which most often protrudes with respect to the support (see FIG. 4B, reference 60) is consequently itself subjected to the laminating pressure, of the order of 1000 kgf/cm2, with the scrapping problems that this generates, as explained above.

Reference is now made to FIG. 2 which shows a flowchart of the manufacturing method modified according to the invention.

In a way similar to the known method, the process begins by supplying and preparing (steps 30, 31, 32) the necessary components, namely plastic or paper sheets intended for the production of the supports, silk-screen printed, etched or other antennas, and individualized electronic modules.

Preferably, before cutting out the support sheets, adhesive is applied to them (step 33). This operation consists in coating the support sheets (lower and/or upper) with an adhesive, notably a printed adhesive, for example by material jet, hot transfer, coating or other means.

Then the cutting out (step 35) of the supports and the production of the cavities in the supports are carried out, these cavities being intended for receiving the electronic modules.

Then the inserts are assembled (step 36), which comprises several sub-steps. Thus, an antenna previously cut out from a sheet bearing a plurality of antennas is deposited on each adhesive-coated lower support. Then an upper support element, preferably also previously coated with adhesive, is added on top of the antenna. Then a light pressure is applied, manually or automatically, in order to prefix the elements together to make their handling easier.

After assembly of the insert, the lamination (step 37) of this stack is carried out, according to well-known laminating methods. The layers of the stack such as are produced include only passive components which easily withstand the typical laminating pressure.

If it is still necessary at this stage (depending on the initial size of the support sheets), the stacked and laminated sheets are cut out (step 38) into assemblies corresponding to two or three future inserts, according to the requirements of the inserting machine used for adding the modules.

The modules are then inserted (step 39), that is to say the previously individualized modules are inserted into the corresponding cavity provided for this purpose (see FIG. 3) on each insert, and a light pressure is applied (of the order to 16 kgf/cm$^2$) to each module, which has the effect of mechanically fixing the module to the insert, in an adhesive-coated area of the latter.

The result of this modified manufacturing method is that the modules are used only after the step of lamination of the inserts, which has a positive effect on the manufacturing yields since the modules can no longer be destroyed during the lamination. Moreover, the use of previously adhesive-coated supports makes it possible to eliminate the handling of sheets of adhesive and makes it possible to increase, that is to say to multiply substantially by two, the production rate of the inserts.

FIG. 3 shows a plan view of two inserts 41, still joined together, before insertion of a module (not shown) in each cavity 42 and individualizing of the inserts 41 by cutting out.

Reference is now made to FIG. 4 which shows, in a cross-sectional view through A-A of FIG. 3, the structure of an insert such as is manufactured according to the method according to the prior art. FIG. 4A shows the overall cross-section and FIG. 4B shows a more detailed cross-sectional view of the insert in the vicinity of the electronic module 44.

As can be seen, there is a slight excess thickness 60 in the upper surface of the module, even after lamination, which clearly shows that it is the module that has above all been exposed to the laminating pressure.

Moreover, because of the presence of the antenna 43 on the left hand part of the insert, the latter has an excess thickness 70 of its left hand part in comparison with its right hand part which has no antenna.

Reference is now made to FIG. 5 which shows, in a cross-sectional view through A-A of FIG. 3, the structure of an insert 41 such as is manufactured by the method modified by the invention. FIG. 5A shows the overall cross-section of the insert 41 and FIG. 5B is a more detailed cross-sectional view of the insert in the vicinity of the electronic module 44.

As can be seen, besides the fact that the module 44 has been inserted in its cavity 42 only after the lamination, the differential thickness between the area (on the left hand side) provided with the electronic module and the area (on the right hand side) that does not have a module, has been compensated for by the insertion of a thickness-compensation layer 55. This thickness-compensation layer 55 can be obtained by insertion of a compensating sheet made of plastic or paper. However, this layer having a very thin thickness of the order of 80 micrometers for example, is preferably obtained by printing.

The support layers 46 are for example made of Teslin (registered trade mark), and the adhesive 54 is preferably deposited on each support layer 46 by silk-screen printing, instead of the sheets of adhesive used in the prior art which necessitated a protective support or "liner".

The adhesives 54 used for the manufacture of the inserts 41 can be thermoplastic materials (polyurethanes, polyesters, polyamides, etc.) or heat-hardening materials (polyesters, phenolics, epoxides, etc.).

ADVANTAGES OF THE INVENTION

The insertion of the electronic modules after the lamination of the inserts for passports according to the method according to the invention has a series of advantages, including:

The elimination of the cycle of stress on the module during the lamination in the press. This makes it possible to better control the temperature and the pressure applied on the module.

An increased reliability of the insert, because of the reduction of mechanical and thermal stresses during the manufacture of the insert.

Higher manufacturing rates, notably because of the elimination of steps of handling sheets of adhesive, the support sheets now being previously coated with adhesive, for example by glue printing.

Better flatness of the inserts, because of a more effective and less expensive thickness-compensation.

Greatly reduced scrapping and increased overall manufacturing yield, because the insertion of the modules after lamination makes it possible to insert only good modules in good inserts, and this so-called insertion operation is carried out using well mastered techniques.

KEY TO THE DRAWINGS

43: antenna
44: electronic module
45: sheet of adhesive
46: support or substrate
47: adhesive of the module
54: adhesive printed on support
55: thickness-compensation layer

The invention claimed is:

1. A method for manufacturing inserts provided with an electronic module bearing a chip and an antenna, comprising:
providing lower and upper support sheets for plural inserts, said supports being provided with cavities for the subsequent insertion of an electronic module in each cavity;
providing an antenna for each insert;
providing at least one layer of adhesive;
providing an electronic module for each insert;
superimposing and assembling by lamination a support sheet, a first layer of adhesive, a plurality of antennas, a second layer of adhesive and another support sheet;
cutting out the laminated assembly in such a way as to obtain inserts each provided with an antenna;
inserting the electronic modules into the cavities after the step of lamination of the support sheets, the antennas and the layers of adhesive, and, on the inside face of at least one of the support sheets, a thickness-compensation layer, outside of the area of the support intended for receiving the antenna.

2. The manufacturing method as claimed in claim 1, wherein each electronic module is prefixed in a corresponding cavity of the insert using a light pressure that is substantially at least two orders of magnitude less than the laminating pressure during the step of lamination of the support sheets.

3. The manufacturing method as claimed in claim 2, wherein the fixing pressure of the electronic module during the insertion step is of the order of 10 to 20 kgf/cm2.

4. The manufacturing method as claimed in claim 1, wherein the adhesive deposited between the support sheets and the antennas is an adhesive printed on the support sheets.

5. An insert for the manufacture of an electronic passport, wherein it is produced according to the manufacturing method as claimed in claim 1.

6. A booklet, notably a booklet for a passport, wherein an insert as claimed in claim 5 is integrated between at least two of its pages.

* * * * *